United States Patent [19]

Lomenech et al.

[11] 4,280,720

[45] Jul. 28, 1981

[54] HORIZONTALLY DEVELOPING MULTI-FUNCTIONS ROTATING CONNECTION

[75] Inventors: Hervé Lomenech; Jean-Paul Sarrailh, both of Pau, France

[73] Assignee: Societe Nationale Elf Aquitaine (Production), Paris, France

[21] Appl. No.: 928,083

[22] Filed: Jul. 26, 1978

[30] Foreign Application Priority Data

Aug. 4, 1977 [FR] France .............................. 77 24045
Jun. 26, 1978 [FR] France .............................. 78 19015

[51] Int. Cl.³ .......................................... F16L 39/04
[52] U.S. Cl. ................................ 285/136; 285/272
[58] Field of Search .............. 285/136, 272, 134, 190

[56] References Cited

U.S. PATENT DOCUMENTS

| 2,293,585 | 8/1942 | Bard | 285/136 |
|---|---|---|---|
| 2,662,785 | 12/1953 | Fawick | 285/136 |
| 2,689,753 | 9/1954 | Wechsler | 285/272 |
| 3,527,482 | 9/1970 | Casterline et al. | 285/136 |
| 3,698,433 | 10/1972 | Dobler et al. | 285/136 |
| 4,142,742 | 3/1979 | Cornett et al. | 285/136 |

FOREIGN PATENT DOCUMENTS

47-48050 12/1972 Japan ...................................... 285/136

Primary Examiner—Thomas F. Callaghan
Attorney, Agent, or Firm—Brisebois & Kruger

[57] ABSTRACT

A rotating connection device for a plurality of conduits in which a fixed part is constituted by a disc limited by a lower face and an upper face, each of the faces having a common axis of revolution, and at least one part able to move rotatingly around the common axis of revolution. The rotating connection is characterized in that each movable part is located in an annular groove cut out of the fixed part and open only on the upper face of the fixed part, each annular groove, in radial section presenting curves whose concavity is directed towards the upper face of the fixed part, each movable part defining with the fixed part an annular space, the annular space being connected only with the lower face of the fixed part and the upper part of the movable part by conduits bored respectively in the fixed and movable parts.

6 Claims, 7 Drawing Figures

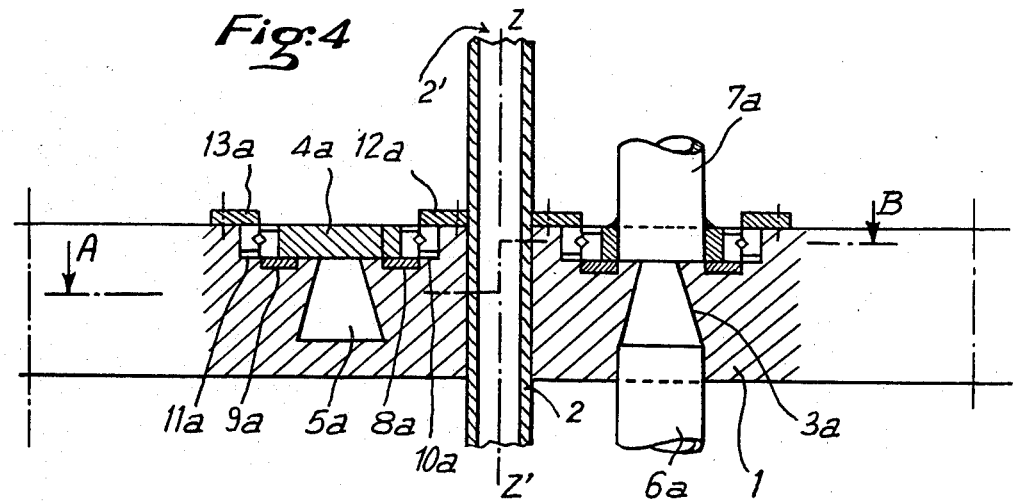
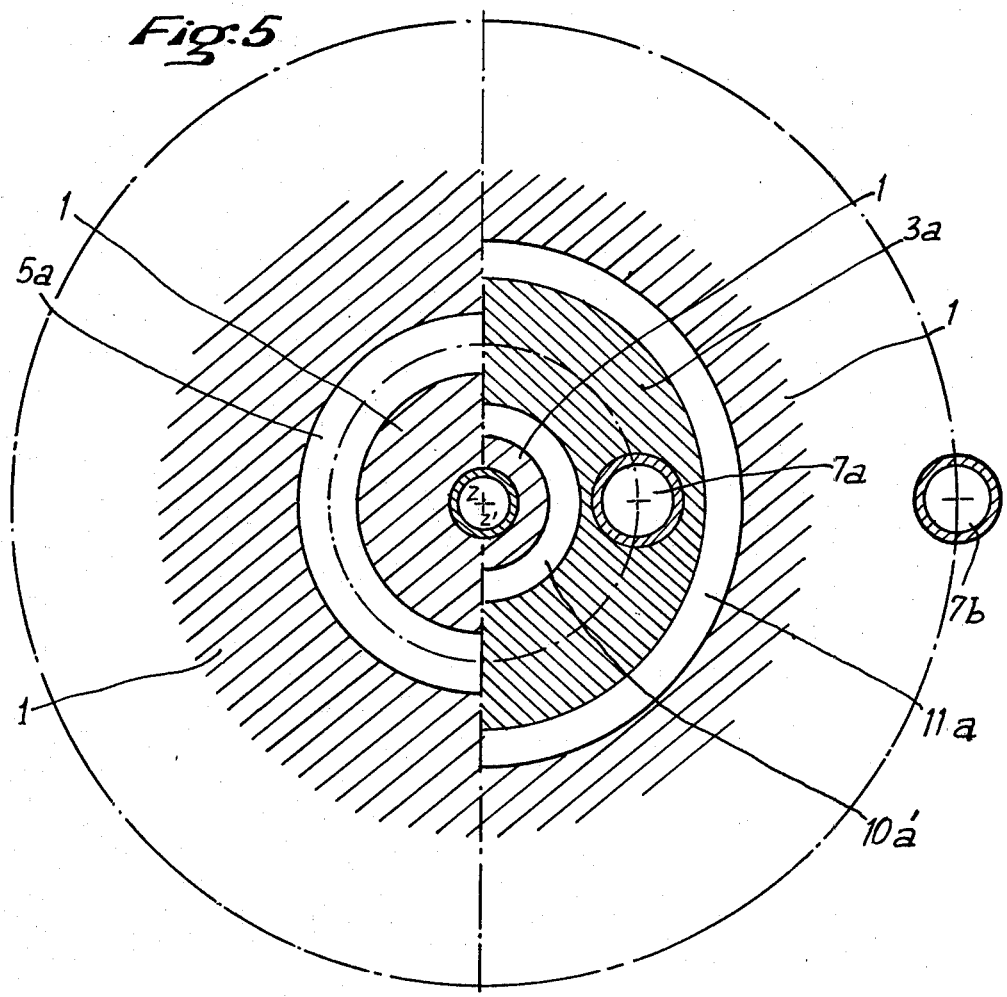

HORIZONTALLY DEVELOPING MULTI-FUNCTIONS ROTATING CONNECTION

The present invention is related to a device for connecting transfer pipes integral with a substantially fixed equipment to similar pipes integral with a movable equipment, said device being called a multifunctions rotating connection.

Various connecting devices for a plurality of pipes are already known which associate around a single axis of rotation of fixed part possibly integral with a cylindrical tubular pipe and at least one movable part rotating around the single axis of rotation.

For some of such devices, each movable part defining an annular space with the fixed part contributes to define more than one annular space; said annular spaces may be arranged in such a way that their barycenters are substantially merged, the device has then a horizontal development as in FIG. 1, or they may also be arranged in such a way that their barycenters are spaced along the axis of rotation, and the device then has a vertical development as in FIG. 2. For other devices, each movable part contributes to define only one annular space, but then the barycenters of the annular spaces are spaced along the axis of rotation and cannot be merged, and the devices then have only a vertical development as in FIG. 3.

Each type of construction has its advantages and its drawbacks, however in both cases it is possible to work on a movable part, particularly the sealing gaskets or the rolling devices which provide the contact with the fixed part, only by stopping the operation of the whole device.

Rotating connection devices for a plurality of pipes are already known as in U.S. Pat. No. 3,527,482 to Casterline et al, which comprise a fixed part carrying at least part movable around a single axis of rotation. The fixed part is disc-shaped. Each movable part is set in an annular groove cut in the surface of the disc. Pipes provided on the one hand in the fixed part and on the other hand in each movable part open on the groove walls, said pipes being finished off by fluid inlet and outlet nozzles located on the same side of the disc. Such an arrangement allows for some clearance between the fixed part and each movable part but it does not allow a free rotation of the movable parts in relation to the fixed part.

The present invention overcomes this drawback by achieving a rotation connection allowing the movable parts to rotate freely with regard to the fixed part.

A rotating connection for a plurality of pipes according to the invention comprises:

A fixed part consisting of a disc limited by a lower and an upper face, each of said faces having a revolution symmetry around a common axis;

and at least a movable part rotating around the common axis of revolution symmetry of the upper and lower faces of the fixed part.

Each movable part in lodged in an annular groove cut into the fixed part and opened only on the upper face of the fixed part.

For each of the annular grooves, the two sections along a plane passing by the axis of rotation present a concavity directed towards the upper face of the fixed part.

Each movable part defines with the fixed part an annular space of revolution around the same axis, said annular space being isolated from the outer space and from the other annular spaces by at least two annular sealing gaskets, said annular space being moreover limited by a surface marked on the movable part and by a surface marked on the fixed part.

A connection according to the invention is characterized in that each of said surfaces comprises an aperture for the passage of fluids, that is there is one aperture which opens onto the surface marked on the fixed part and is connected through a pipe to a nozzle opening on the lower surface of the fixed part, and a second aperture which opens onto the surface marked on the movable part and is connected through a pipe to a nozzle opening on the outer periphery of the movable part directed towards the upper face of the fixed part.

In a preferred embodiment of the invention, the fixed part is constituted by a disc limited by a lower surface and an upper surface, each movable part being lodged in an annular groove cut into the upper surface of the disc.

In the devices intended for the passage of fluids under low pressures, the annular sealing gaskets which isolate an annular space from the outside are in contact with the fixed part and with the movable part along plane surfaces perpendicular to the axis of rotation.

In the devices intended for the passage of fluids under high pressures, the annular sealing gaskets which isolate an annular space from the outside are in contact with the fixed part and with the movable part along frustoconical surfaces pertaining to cones of revolution around to said single axis, or also along cylindrical surfaces of revolution around the said single axis.

In the devices intended for the passage of at least one fluid which has to be maintained at a predetermined temperature, the fixed part and the movable part corresponding to the interested annular space comprise in the vicinity of the surfaces limiting said annular space thermoregulation and control.

In the embodiments wherein the pipes connected two by two have large diameters, particularly for the passage of liquids and gases or aggregates with very high flow rates per hour, the fixed part sustains each movable part by interposition of at least thrust-bearing.

In the embodiments wherein the multi-functions rotating connecting device having an horizontal development has to take the smallest possible horizontal space, the thrust-bearings placed between each of the successive movable parts and the fixed part are located alternatively on both sides of the sealing gaskets in their entirety.

The following examples of embodiments are given only by may of illustration in relation to attached figures wherein:

FIG. 4 is a multi-circuit connection with plane connecting means

FIG. 5 is a sectional view perpendicular to the axis of FIG. 4;

Figure 1:
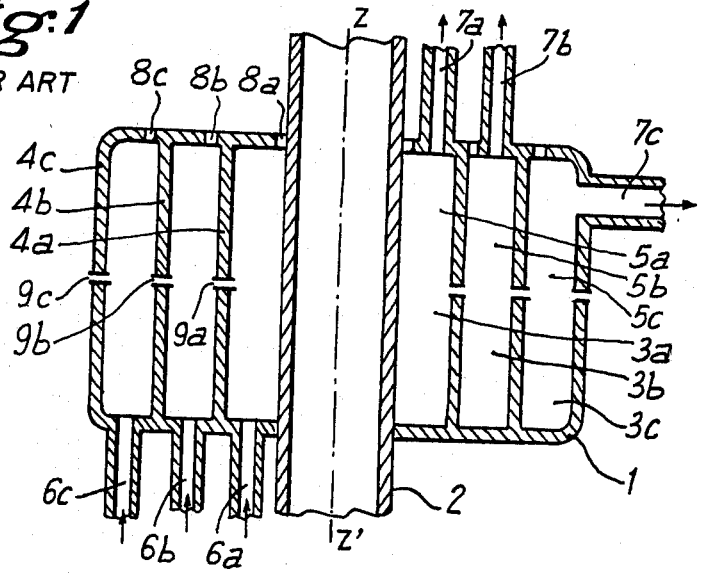
FIG. 1 is a horizontal multi-circuit connection according to the prior art.

On FIG. 1, which represents schematically an already known multi-circuit device having a horizontal development, a fixed part 1 is integral with a cylindrical tubular pipe 2, having an axis ZZ', said fixed part 1 defining three annular grooves 3a, 3b and 3c of revolution around the axis ZZ' and being opened in the direction Z. Three annular movable parts 4a, 4b and 4c, of revolution around the axis ZZ', are such that 4a, the first one when going from the axis ZZ' towards the outside, defines with the fixed part 1 and the tubular pipe 2 an annular space 5a comprising the groove 3a, and such that each of the other movable parts 4b and 4c defines with the fixed part and the first movable part an annular space 5b and 5c, each of them comprising one of the grooves 3b and 3c.

Pipes 6a, 6b and 6c, intended for the passage of one fluid, open respectively into grooves 3a, 3b and 3c, cut into the fixed part 1. Each of pipes 7a, 7b and 7c, intended for the passage of one the fluids to be transferred, opens onto the periphery of each of the annular spaces 5a, 5b and 5c, through the mass of each movable part 4a, 4b and 4c.

Each movable part is separated from the fixed part for 4a, from the fixed part and one movable part for 4b and 4c, by means of sealing gaskets 8a, 8b, 8c, 9a, 9b, 9c. The assembly of the movable parts and the fixed part is kept in position by means of annular thrust-bearings (not represented).

Such a multi-circuit connecting device, known per se, takes indeed a small vertical space, since the number of circuits is increased by adding concentric annular elements. However, such a device present the drawback that a circuit cannot be repaired without interrupting the other circuits.

Figure 2:
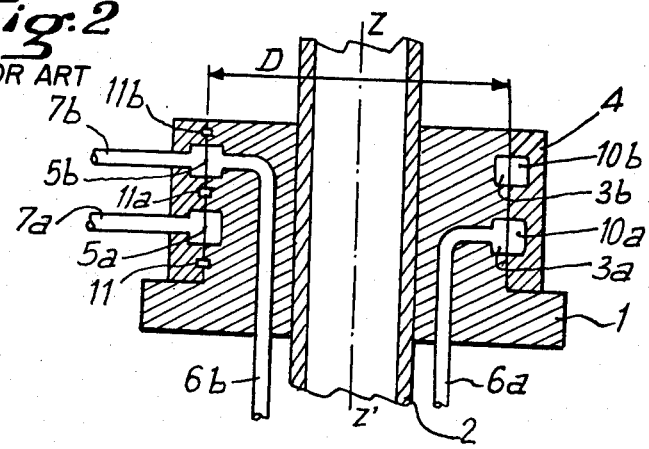
FIG. 2 is vertical multi-circuit connection according to the prior art.

FIG. 2 shows schematically a known multi-circuit device having a vertical development, wherein an annular fixed part 1, integral with a cylindrical tubular pipe 2 is associated with only one movable part 4 which is also annular. Both parts 1 and 4 are cylindrical and in contact along a cylindrical surface of revolution of diameter D. On the periphery of the cylindrical surface of part 1 two annular grooves 3a and 3b are cut out and on the inner contour of the movable part 4 annular grooves 10a and 10b are cut out each in front of one of grooves 3a and 3b. Grooves 10a and 3a constitute the annular space 5a while grooves 10b and 3b constitute the annular space 5b.

On the periphery of each of the grooves 3a and 3b pipes 6a and 6b open for the passage of a fluid to be transferred.

On the periphery of each of the grooves 10a and 10b pipes 7a and 7b open.

The fixed part and the movable part are separated by sealing gaskets 11, 11a, 11b and by annular thrust-bearings (not represented).

Such a device, represented schematically with only two circuits, has the drawback of taking a vertical extension proportional to the number of circuits, which rapidly limits the advantage represented by the contact between cylindrical surfaces. Such a device is used for connecting small diameter pipes and can be used with a multiplicity of large diameter pipes only with difficulty.

Figure 3:
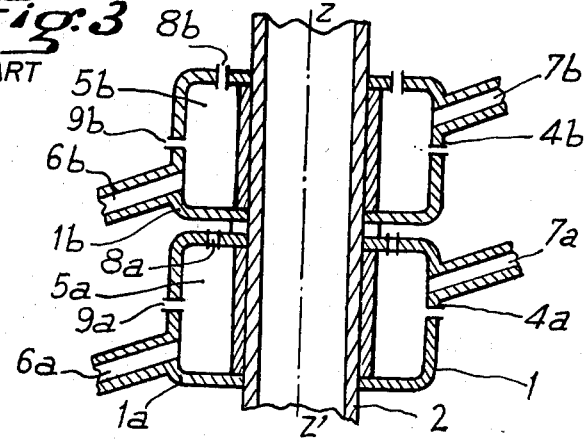
FIG. 3 is another vertical multi-circuit connection according to the prior art.

FIG. 3 represents a known multi-circuit device having a vertical development and associating an annular fixed part 1, integral with a cylindrical tubular pipe 2, with at least one movable part, here two movable parts 4a and 4b.

Each movable part such as 4a participates in defining a simple annular space such as 5a.

On the periphery of each annular space, such as 5a, a pipe 6a opens though the fixed part 1 and a pipe 7a opens though the movable part 4a.

Each movable part such as 4a is in contact with the fixed part 1 by means of sealing gaskets such as 8a and 9a.

The fixed part 1 may be of one piece or constituted by as many similar annular pieces, such as 1a and 1b, as the number of circuits, said pieces being fixed on a cylindrical tubular pipe 2, for example by means of a thread (not represented).

Such a device, wherein the circuits are mechanically separated, enables each circuit to be put into operation or out of operation indenpendently of the other circuits, which is not possible with the devices of FIGS. 1 and 2. However, as for the device of FIG. 2, the vertical development of the circuits makes it difficult to fit several circuits, particularly if the circuits diameter is large. The overall height space is then excessive. In that case, although the circuits can be interrupted separately, it is not possible to make complex repairs involving a change of parts, movable parts with sealing linings, on the circuits other than the upper one.

FIGS. 4 and 5 are a plane and a vertical section of a multi-circuit connection having a horizontal development, according to the invention.

FIG. 4 shows a fixed part 1 having the shape of a disc the periphery of which is inscribed in a surface of revolution around an axis ZZ'.

Said fixed part 1 is limited between an upper surface 1a and a lower surface 1b, constituted by planes perpendicular to the axis ZZ'. This fixed part 1 has an aperture 2' coaxial with the axis ZZ', said aperture being delimited by a cylindrical tubular pipe 2, fixed integral with the fixed part 1.

On the upper surface 1a of the fixed part at least one annular groove such as 3a is cut out and constitutes a surface of revolution defined by the rotation around the axis ZZ' of a contour having a concavity directed only in the direction going from Z' to Z of the axis of rotation ZZ'.

Each annular groove, such as 3a, constitutes partly a recess for a movable part such as 4a, which is annular of revolution around the axis ZZ'. Said movable part 4a is such that part of its periphery delimitates with the fixed part 1 an annular space 5a constituted by a part of the groove 3a.

The annular space 5a is limited by a surface 5a' marked on the fixed part end by a surface 5a" marked on the movable part. On the surface 5a' a pipe 6a opens, which is connected though the mass of the fixed part 1 to a nozzle opening onto the lower face 1b of said fixed part. On the surface 5a" a pipe 7a opens, which is connected through the mass of the movable part 4a to a nozzle opening onto the periphery of the movable part directed towards the upper face 1a of the fixed part 1.

The movable part 4a is in contact with the fixed part 1 by means of two annular sealing gaskets 8a and 9a, limited by plane surfaces, and in contact by said plane surfaces on the one hand with the fixed part 1 and on the other hand with the movable part 4a.

The movable part 4a is carried by the fixed part 1 by interposition of two thrust-bearings such as ball bearings 10a and 11a, themselves each maintained by one of the clamps 12a and 13a, attached on the fixed part 1 in a removable way, for instance by means of screws (not shown in the drawings).

FIG. 5 shows, on the right side, a sectional view taken in plane B perpendicular to axis ZZ' as indicated in FIG. 4, and on the left side, a sectional view taken in plane A perpendicular to axis ZZ' as indicated in FIG. 4.

FIG. 5 shows, on the right, a sectional view of the fixed part 1 on both sides of the annular groove 3a in which the annular movable part 4a is mounted. Said movable part 4a is separated from the fixed part 1 by two annular spaces 102 and 112 occupied by the rolling means 10a and 11a (shown in FIG. 4).

A cylindrical pipe 7a, the axis of which is parallel to ZZ', shown on FIG. 5 in cross-sectional view, goes through the movable part 4a. Said pipe opens into an annular space 5a subjacent to the movable part 4a on FIG. 5 and shown in meridian section on FIG. 4.

FIG. 5 shows on the left a sectional view of the fixed part 1 on both sides of the annular groove 3a in that part of the groove which constitutes the annular space 5a.

The means for connecting a circuit of index (a) are represented on FIG. 5 by way of example; a rotating connecting device can have a plurality of such means which constitute coaxial assemblies. By way of example, the pipe 7b of the closest coaxial assembly has been represented on FIG. 5.

Figure 6:
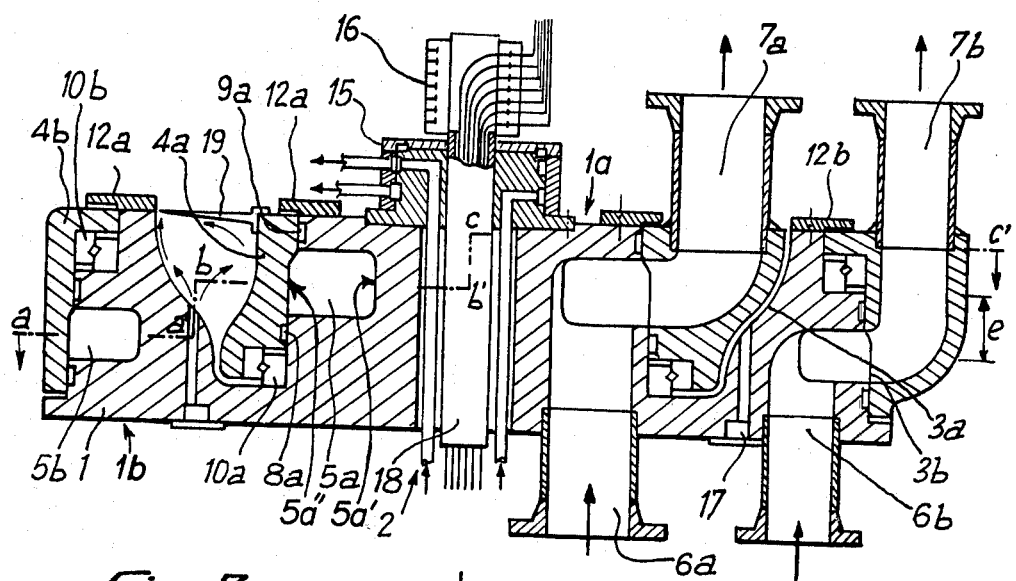
FIG. 6 represents another multi-circuit connection with cylindrical connecting means.

FIG. 6 shows a fixed part 1 having the shape of a disc the periphery of which is inscribed in a surface of revolution around an axis ZZ', said fixed part having a cylindrical central aperture 2 of axis ZZ'.

By way of example, two grooves 3a and 3b which cut the fixed part 1 are represented. Said grooves are delimited each by a surface of revolution around the axis ZZ'. These grooves are open in the direction Z of the axis ZZ', each groove such as 3a is used partly as recess for an annular movable part such as 4a inscribed in a surface of revolution around the axis ZZ', and is such that part of its periphery delimits with the fixed part 1 an annular space 5a constituted by part of groove 3a.

The annular space 5a is limited by a surface 5a' marked on the fixed part and by a surface 5a'' marked on the movable part. A pipe 6a opens onto the surface 5' and is connected through the mass of the fixed part 1 to a nozzle opening onto the lower face 1b of said fixed part. A pipe 7a opens onto surface 5'' and is connected through the mass of the movable part 4a to a nozzle opening onto the periphery of the movable part directed towards the upper face 1a of the fixed part 1.

The movable part 4a is in contact with the fixed part 1 by means of two annular sealing gaskets 8a and 9a in contact by their opposed cylindrical annular surfaces with on the hand, the fixed part 1 and, on the other hand, the movable part 4a.

The movable part 4a is carried by the fixed part 1 by interposition of a thrust-bearing such as the ball bearing 10a. In the embodiment according to FIG. 6, which comprises cylindrical connections, one ball bearing is enough, while in the device according to FIG. 4, it was necessary to have two ball bearings, one on each side of the movable annular part 4a.

The movable parts 4a and 4b are maintained in their annular recess by means of planar annular clamps 12a and 12b attached to the fixed part 1 in a removable way, for example by means of screws (not shown).

On FIG. 6 the annular spaces 5a and 5b are located in two separate planes perpendicular to the axis ZZ' and spaced by a distance e of about the third of the thickness of the plate which constitutes the annular fixed part 1. This enables, by giving a suitable shape to the movable parts 4a and 4b, the reduction of the overall dimensions of the unit comparison with a mere juxtaposition of devices such as that of the assembly indicated by the reference (a).

The most compact embodiment in the directions perpendicular to the axis ZZ' is constituted by an alternance of devices such as referenced (a) and of devices referenced (b).

FIG. 6 shows, attached on the fixed part 1, a rotating connection device 15, known per se, for a plurality of pipes, such as the one of FIG. 2.

This device is used here for the passage of two pipes having small sections.

FIG. 6 shows also, attached on the fixed part 1, above the device 15, a rotating connection device 16 known per se for electrical conduits.

Figure 7:
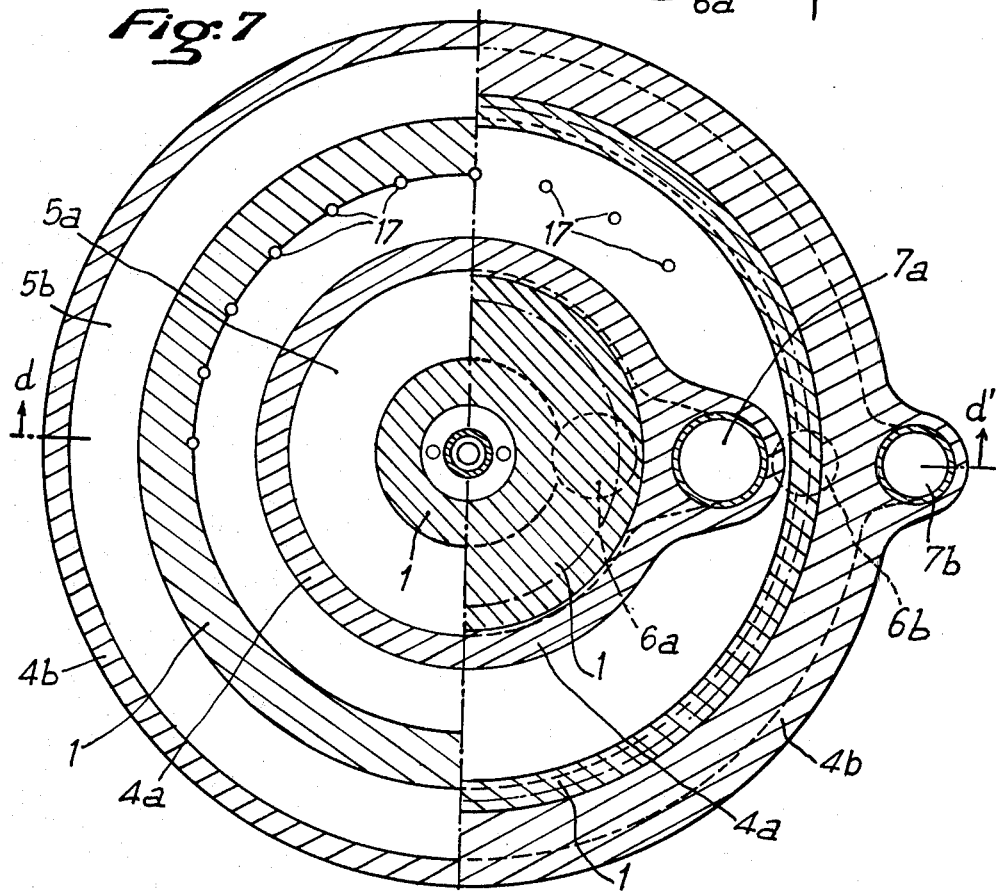
FIG. 7 is a sectional view perpendicular to the axis of FIG. 6.

FIG. 7 is a plane view of a section of the device of FIG. 6 along the planes indicated from left to right by the successive references aa', bb' and cc'.

From left to right there appears:

in the section trough plane aa', the annular space 5b comprised between the movable part 4b and the fixed part 1, in the section through plane bb', the annular space 5a comprised between the movable part 4a and the fixed part 1, in the section through plane cc', first the fixed part 1 in contact with the movable part 4a, the connection not being shown and the periphery of pipe 6a being represented by a dotted line while the periphery of pipe 7a is represented by a plain line, then the fixed part 1 in contact with the movable part 4b, the connection not being shown and the periphery of pipe 6b being represented by a dotted line while the periphery of pipe 7b is represented by an unbroken line.

FIGS. 6 and 7 show in various areas of the fixed part 1 the passages for air-conditioning sheathes 17 to be connected to the source of a fluid, generally water, heated to a predetermined temperature.

FIG. 6 also shows a thermal insulation sheath 18 surrounding the electric wires bedded in the axial zone of aperture 2 and opening onto the rotating connection device 16 for said electric conduits.

Deflectors, such as 19, are generally attached to the fixed part 1 or to the movable part 4a, as indicated on FIG. 6, to cover that part of groove 3a which es not occupied by the movable part 4a. Such multicircuit rotating connection devices as have been described hereinabove in the two embodiments illustrated by FIGS. 4, 5 and 6 are used to solve many problems relating to the transfer of fluid materials or of materials which can be assimilated to fluids, for example aggregates. These problems are, in a very general way, those which arise when connecting a fixed storage means with another storage means which is movable or is likely to move in a controlled or uncontrolled way.

The multi-circuit rotating connection devices according to FIGS. 4 and 5 are used for transferring fluids under low pressures, since any increase in the pressure above the hydrostatic pressure tends to separate the movable part of the considered circuit from the common fixed part.

For that reason, the embodiments according to FIGS. 6 and 7 are generally preferred, since they allow fluid transfers under any pressure and with any flow rate. Such devices allow the passage of fluids at various temperatures since air-conditioning sheathes are provided for minimizing the interaction between the various part of the unit.

It is to be noted that the horizontal development of such devices gives a stability which is all the better that the number of circuits is higher, whereas the presently used devices with a vertical development give the opposite result.

The maintenance problems with the multi-circuit devices having a horizontal development are highly facilitated since each circuit can be interrupted end disassembled, and worn parts can be changed, by means of usual handling means.

Such multi-circuit devices with a horizontal development can be used at sea, either as buoy annex the average position of which is fixed by means of a plurality of anchorages, or at the end of an oscillating or articulated column. They can also be used on land.

The fact that this device is perfectly adapted to solve the problems raised by the continuous transfer of oil or gas from an under-water fixed tank or source to a ship whose direction with respect to the loading point varies according to the wind and to the currents, is essentially due to the dissociation between the inlet nozzles, located on the lower face of the fixed part of the connection, and the outlet nozzles located on the upper face of the connection.

What is claimed is:

1. A rotating connection device for a plurality of conduits, comprising a fixed part constituted by a disc limited by a lower face and an upper face, each of said faces having a common axis of revolution, at least two parts able to move rotatingly around said common axis of revolution, said rotating connection being characterized in that each movable part is located within an annular groove cut out of the fixed part, said groove having an annular opening through the upper face of said fixed part for upward removal of the movable part, each movable part forming a single annular space with the fixed part, said movable part isolating said said annular space from said groove and from any other annular spaces by at least two annular sealing gaskets, said annular space being moreover defined by a surface on the movable part and by a surface on the fixed part, each said surface having an aperture for the transfer of fluids, a first aperture opening through said surface of the fixed part and connected by a passage in the fixed part to a conduit open on the lower surface of the fixed part, a second aperture opening through said surface of the movable part and connected by a passage in the movable part to a conduit open on the periphery of the movable part and directed towards the upper face of the fixed part.

2. A device according to claim 1 wherein the fixed part and the movable part corresponding to a predetermined annular space include thermo-regulating and control means located in the vicinity of the surfaces defining said annular space.

3. A device according to claim 1 wherein the annular sealing gaskets which isolate an annular space from the outer medium are in contact with the fixed part and with the movable part along planar surfaces perpendicular to the axis of rotation.

4. A device according to claim 1 wherein the annular sealing gaskets isolating an annular space from the outer medium are in contact with the fixed and with the movable part along cylindrical surfaces of revolution around said common axis.

5. A device according to claim 1 wherein the fixed part carries each movable part by interposition of at least one thrust-bearing.

6. A device according to claim 5 wherein the thrust-bearing placed between each of the successive movable parts and the fixed part are located alternatively on both sides with respect to the sealing gaskets in their entirety.

* * * * *